United States Patent
Liu et al.

(10) Patent No.: US 10,493,593 B2
(45) Date of Patent: Dec. 3, 2019

(54) WHEEL OUTER RIM FILLET DRESSING DEVICE

(71) Applicant: CITIC Dicastal CO., LTD., Qinhuangdao, Hebei (CN)

(72) Inventors: Huiying Liu, Qinhuangdao (CN); Shan Ma, Qinhuangdao (CN); Yule Zhou, Qinhuangdao (CN); Junmeng Li, Qinhuangdao (CN); Xiaopeng Chen, Qinhuangdao (CN); Yongwang Zhao, Qinhuangdao (CN)

(73) Assignee: CITIC DICASTAL CO., LTD., Qinhuangdao, Hebei (CN)

( * ) Notice: Subject to any disclaimer, the term of this patent is extended or adjusted under 35 U.S.C. 154(b) by 133 days.

(21) Appl. No.: 15/801,410

(22) Filed: Nov. 2, 2017

(65) Prior Publication Data
US 2019/0061101 A1  Feb. 28, 2019

(30) Foreign Application Priority Data
Aug. 27, 2017 (CN) .......................... 2017 1 0746844

(51) Int. Cl.
*B24B 5/44* (2006.01)
*B24B 5/12* (2006.01)
(Continued)

(52) U.S. Cl.
CPC .............. *B24B 53/14* (2013.01); *B21D 53/30* (2013.01); *B24B 5/12* (2013.01); *B24B 5/44* (2013.01);
(Continued)

(58) Field of Classification Search
CPC .... B24B 5/44; B24B 9/02; B24B 9/04; B24B 21/02; B24B 21/12; B24B 21/16;
(Continued)

(56) References Cited

U.S. PATENT DOCUMENTS

| | | | |
|---|---|---|---|
| 3,258,804 A | * | 7/1966 | Fowle ..................... B24B 5/225 15/104.011 |
| 4,216,560 A | * | 8/1980 | Schmidt .................. B24B 41/06 15/268 |

(Continued)

FOREIGN PATENT DOCUMENTS

| | | | | |
|---|---|---|---|---|
| GB | 667407 A | * | 2/1952 | ............... B24B 5/44 |
| JP | 3044289 B2 | * | 5/2000 | |
| JP | 3091417 B2 | * | 9/2000 | |

*Primary Examiner* — Eileen P Morgan
(74) *Attorney, Agent, or Firm* — Cooper Legal Group, LLC (57) ABSTRACT

A wheel outer rim fillet dressing device, wherein after a wheel is roughly positioned, an electric cylinder drives a moving plate to descend to an appropriate position, an adjusting cylinder drives a second sliding table to move away from a first sliding table, the first sliding table moves synchronously with the second sliding table under the action of a second gear rack, thus the distance between a precision positioning post on the first sliding table and a precision positioning post on the second sliding table is adjusted, and the precision positioning posts contact a vertical surface of a cap seam allowance of the wheel and hold the wheel tightly. The adjusting cylinder is restarted, and the outer rim fillets can be dressed when the distance between first and second cutters for dressing wheel outer rim fillets is adjusted to an appropriate position and under the cooperation of the rotating wheel.

1 Claim, 6 Drawing Sheets

(51) Int. Cl.
*B24B 9/04* (2006.01)
*B24B 53/14* (2006.01)
*B21D 53/30* (2006.01)
*B24B 53/07* (2006.01)
*B24B 27/00* (2006.01)
*B24B 41/00* (2006.01)

(52) U.S. Cl.
CPC ............ *B24B 9/04* (2013.01); *B24B 27/0023* (2013.01); *B24B 27/0069* (2013.01); *B24B 27/0076* (2013.01); *B24B 41/005* (2013.01); *B24B 53/07* (2013.01)

(58) Field of Classification Search
CPC ....... B24B 19/00; B24B 5/12; B24B 27/0023; B24B 27/0069; B24B 27/0076; B24B 41/005
USPC .......................................................... 451/65
See application file for complete search history.

(56) References Cited

U.S. PATENT DOCUMENTS

| | | | | |
|---|---|---|---|---|
| 5,134,807 | A * | 8/1992 | Keefe | B24B 7/16 451/259 |
| 5,161,281 | A * | 11/1992 | Hanen | B08B 1/04 15/88.3 |
| 5,762,542 | A * | 6/1998 | Sandvold | B24B 9/002 451/188 |
| 2007/0037497 | A1* | 2/2007 | Tanaka | B24B 5/44 451/312 |
| 2007/0042678 | A1* | 2/2007 | Tanaka | B24B 5/44 451/5 |
| 2013/0102233 | A1* | 4/2013 | Cheon | B24B 27/033 451/331 |

\* cited by examiner

WHEEL OUTER RIM FILLET DRESSING DEVICE

CROSS-REFERENCE TO RELATED APPLICATIONS

The present application claims benefit of Chinese Patent Application No. 201710746844.4, filed on Aug. 27, 2017, the contents of which are hereby incorporated by reference in its entirety.

BACKGROUND

With constant pursuit of customers for high performance of products, outer rim fillets of a wheel have become a very important control part, and the manufacturing precision and consistency thereof directly influence the coverage and appearance of a film. If the outer rim fillets are poor in roundness and consistency, the film is not covered uniformly or is too thin, thus causing great corrosion risk, poor appearance effect and deviation defect. In actual production, burrs at the outer rim are mostly manually removed, so it is difficult to ensure the roundness and consistency of fillets. Therefore, a high-precision automatic device is needed to dress wheel rim fillets after burrs are removed.

At present, a combination of two lathes is mostly adopted for turning in wheel machining, the first stage lathe is mainly used for turning a part of outer rim, an inner rim, a central hole and a flange surface, and the second stage lathe is used for turning a cap section, outer rim fillets and the remaining non-turned outer rim. Such a machining method adopting two devices needs secondary positioning and clamping, so first stage turning and second stage turning have coaxiality deviation, it is difficult to realize high-precision dressing of outer rim fillets by means of outer rim positioning completed by the first stage turning, and a new positioning method is needed.

SUMMARY

The disclosure relates to the technical field of dressing of outer rim fillets after machining of wheels.

The disclosure is aimed at providing a wheel outer rim fillet dressing device, which can meet the requirement of an automatic production line for dressing wheel outer rim fillets.

The disclosure adopts the following technical solution: a wheel outer rim fillet dressing device is composed of a frame, a servo motor, a fixed supporting plate, bearings, a shaft, bearing seats, a rotating disc, positioning guide rails, a positioning roller bed, a first sliding plate, a second sliding plate, a first gear rack, a positioning cylinder, positioning posts, corner cylinder pressure claws, a wheel feeding roller bed, a wheel discharge roller bed, an electric cylinder, a moving plate, guide posts, adjusting guide rails, a second gear rack, a first sliding table, a second sliding table, an adjusting cylinder, first and second cutters for dressing wheel outer rim fillets and precision positioning posts. The whole device can be divided into a wheel roughly positioning system, a precision wheel positioning system, a wheel rotating system and a cutter system for dressing wheel outer rim fillets.

The positioning roller bed and the four positioning guide rails are fixedly mounted on the rotating disc, the first sliding plate and the second sliding plate are symmetrically mounted on the positioning guide rails and connected via the first gear rack, the positioning cylinder is fixed on the side of the positioning roller bed, the output end of the positioning cylinder is connected with the first sliding plate, the four positioning posts are symmetrically mounted on the first sliding plate and the second sliding plate, and a corner cylinder pressure claw is mounted on each positioning post. The wheel feeding roller bed rotates, a wheel enters the positioning roller bed from the wheel feeding roller bed, the positioning cylinder is started to drive the first sliding plate to move, the second sliding plate moves synchronously under the action of the first gear rack, the four positioning posts can roughly position the wheel, the positioning posts retract and leave the outer surface of the wheel after the wheel is roughly positioned, a clearance of 5 mm is kept between the positioning posts and the wheel to facilitate precision positioning of the wheel, and this is the wheel roughly positioning system.

The electric cylinder is mounted above the frame, the output end of the electric cylinder is connected with the moving plate, and the electric cylinder controls the moving plate to move up and down under the guiding effect of the four guide posts. The two adjusting guide rails are symmetrically mounted on the moving plate, the first sliding table and the second sliding table are symmetrically mounted on the adjusting guide rails and connected via the second gear rack, the adjusting cylinder is fixed on the moving plate, and the output end of the adjusting cylinder is connected with the second sliding table. A first cutter for dressing wheel outer rim fillets is mounted at the first end of the first sliding table, a precision positioning post is mounted at the second end of the first sliding table, and a second cutter for dressing wheel outer rim fillets and a precision positioning post are symmetrically mounted on the second sliding table. After the wheel is roughly positioned, the electric cylinder drives the moving plate to descend to an appropriate position, the adjusting cylinder drives the second sliding table to move away from the first sliding table, the first sliding table moves synchronously with the second sliding table under the action of the second gear rack, thus, the distance between the precision positioning post on the first sliding table and the precision positioning post on the second sliding table is adjusted, the precision positioning posts contact the vertical surface of the cap seam allowance of the wheel and hold the wheel tightly, and this is the precision wheel positioning system. The first machining part is adopted for rough positioning, and then the second machining part is adopted for precision positioning, in which the outer rim fillets are machined secondly, so after the positioning standard is converted, the concentricity is better, and the positioning precision is higher. After the wheel is precisely positioned, the corner cylinder pressure claws are started to press the wheel.

The servo motor is mounted on the fixed supporting plate, the output end of the motor is connected with the shaft, the rotating disc is mounted at the output end of the shaft, and the servo motor can control rotation of the rotating disc. After the wheel is pressed, the servo motor is started to drive the wheel to rotate, and this is the wheel rotating system.

When the adjusting cylinder is started to drive the second sliding table to move closer to the first sliding table, the distance between the two precision positioning posts is shortened, meanwhile, the distance between the first cutter for dressing wheel outer rim fillets on the first sliding table and the second cutter for dressing wheel outer rim fillets on the second sliding table is also shortened, the outer rim fillets of the wheel can be dressed when the distance between the first cutter for dressing wheel outer rim fillets and the second cutter for dressing wheel outer rim fillets is adjusted to an appropriate position and under the cooperation of the rotating wheel, and this is the cutter system for dressing wheel outer rim fillets. By integrating the precision wheel positioning system and the cutter system for dressing wheel outer rim fillets, the positioning function and the dressing function can be switched cyclically, thereby saving the space.

The working process of the device is as follows: firstly, a wheel enters the positioning roller bed from the wheel feeding roller bed, then the positioning cylinder is started to drive the four positioning posts to roughly position the wheel, the positioning posts retract and leave the outer surface of the wheel after the wheel is roughly positioned, a clearance of 5 mm is kept between the positioning posts and the wheel, next, the electric cylinder is started to drive the two precision positioning posts to descend and enter into appropriate positions in the cap seam allowance, then the adjusting cylinder is started so that the two precision positioning posts contact the vertical surface of the cap seam allowance of the wheel and hold the wheel tightly and precision positioning of the wheel is completed, the corner cylinder pressure claws press the wheel, the adjusting cylinder is restarted to shorten the distance between the two precision positioning posts, and at the moment, the distance between the first cutter for dressing wheel outer rim fillets and the second cutter for dressing wheel outer rim fillets is also synchronously shortened; next, the servo motor is started so that the wheel is in a rotating state, and dressing of outer rim fillets is completed when the distance between the two cutters for dressing wheel outer rim fillets is adjusted and under the cooperation of the cutting edges and the rotating wheel. After dressing of the fillets is completed, the precision positioning posts, the first cutter for dressing wheel outer rim fillets and the second cutter for dressing wheel outer rim fillets ascend to reset, the corner cylinder pressure claws loosen the wheel, and the positioning roller bed rotates and conveys the wheel to the wheel discharge roller bed. This is a cycle of the device, and so on.

The disclosure can improve the consistency of roundness and fillets of the outer rim, solve the problems of non-uniformity and deviation of outer rim fillets and reduce the probability of outer rim corrosion.

LIST OF REFERENCE SYMBOLS 1 frame
2 servo motor
3 fixed supporting plate
4 bearing
5 shaft
6 bearing seat
7 rotating disc
8 positioning guide rail
9 positioning roller bed
10 first sliding plate
11 second sliding plate
12 first gear rack
13 positioning cylinder
14 positioning post
15 corner cylinder pressure claw
16 wheel feeding roller bed
17 wheel discharge roller bed
18 electric cylinder
19 moving plate
20 guide post
21 adjusting guide rail
22 second gear rack
23 first sliding table
24 second sliding table
25 adjusting cylinder
26 first/second cutter for dressing wheel outer rim fillets
27 precision positioning post
28 cutting edge
29 wheel
30 outer rim fillets

DETAILED DESCRIPTION

Details and working conditions of a specific device provided by the disclosure will be given below in combination with the accompanying drawings.

A wheel outer rim fillet dressing device is composed of a frame 1, a servo motor 2, a fixed supporting plate 3, bearings 4, a shaft 5, bearing seats 6, a rotating disc 7, positioning guide rails 8, a positioning roller bed 9, a first sliding plate 10, a second sliding plate 11, a first gear rack 12, a positioning cylinder 13, positioning posts 14, corner cylinder pressure claws 15, a wheel feeding roller bed 16, a wheel discharge roller bed 17, an electric cylinder 18, a moving plate 19, guide posts 20, adjusting guide rails 21, a second gear rack 22, a first sliding table 23, a second sliding table 24, an adjusting cylinder 25, first and second cutters 26 for dressing wheel outer rim fillets and precision positioning posts 27. The whole device can be divided into a wheel roughly positioning system, a precision wheel positioning system, a wheel rotating system and a cutter system for dressing wheel outer rim fillets.

The positioning roller bed 9 and the four positioning guide rails 8 are fixedly mounted on the rotating disc 7, the first sliding plate 10 and the second sliding plate 11 are symmetrically mounted on the positioning guide rails 8 and connected via the first gear rack 12, the positioning cylinder 13 is fixed on the side of the positioning roller bed 9, the output end of the positioning cylinder 13 is connected with the first sliding plate 10, the four positioning posts 14 are symmetrically mounted on the first sliding plate 10 and the second sliding plate 11, and a corner cylinder pressure claw 15 is mounted on each positioning post 14. The wheel feeding roller bed 16 rotates, a wheel 29 enters the positioning roller bed 9 from the wheel feeding roller bed 16, the positioning cylinder 13 is started to drive the first sliding plate 10 to move, the second sliding plate 11 moves synchronously under the action of the first gear rack 12, the four positioning posts 14 can roughly position the wheel, the positioning posts 14 retract and leave the outer surface of the wheel after the wheel is roughly positioned, a clearance of 5 mm is kept between the positioning posts 14 and the wheel to facilitate precision positioning of the wheel, and this is the wheel roughly positioning system.

Figure 1:
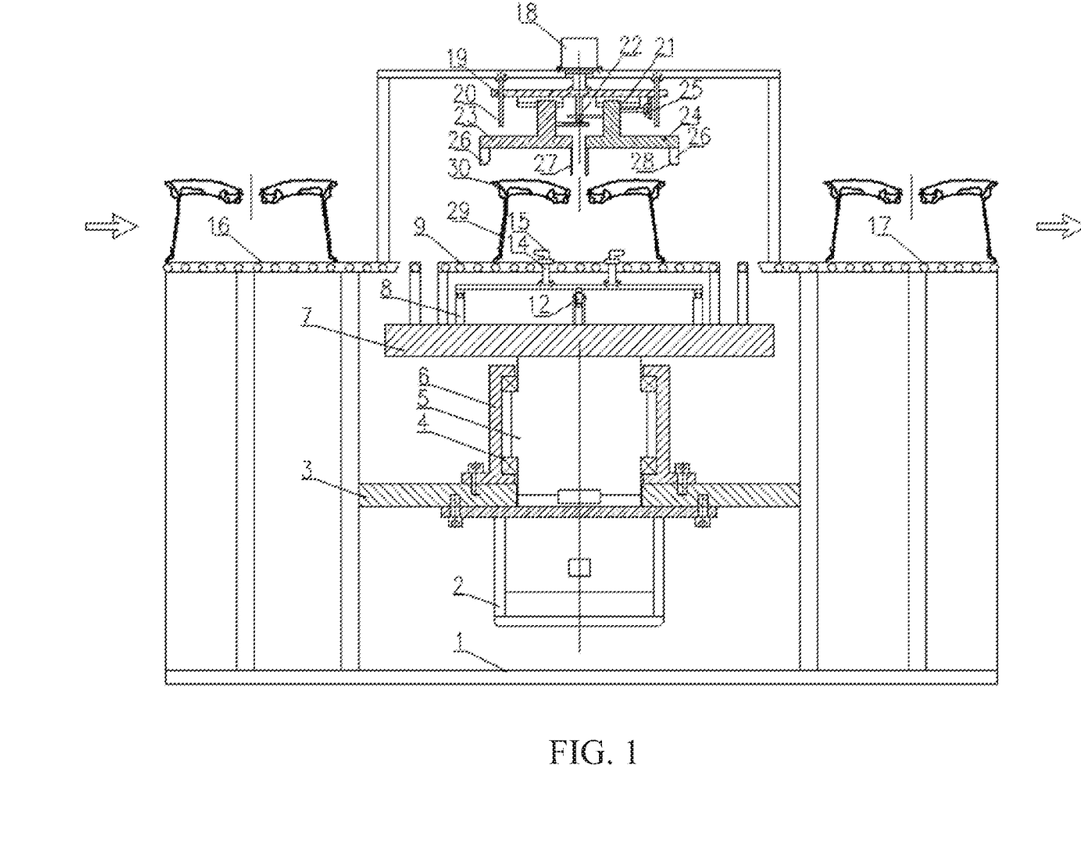
FIG. 1 is a front view of a wheel outer rim fillet dressing device of the disclosure.
Figure 2:
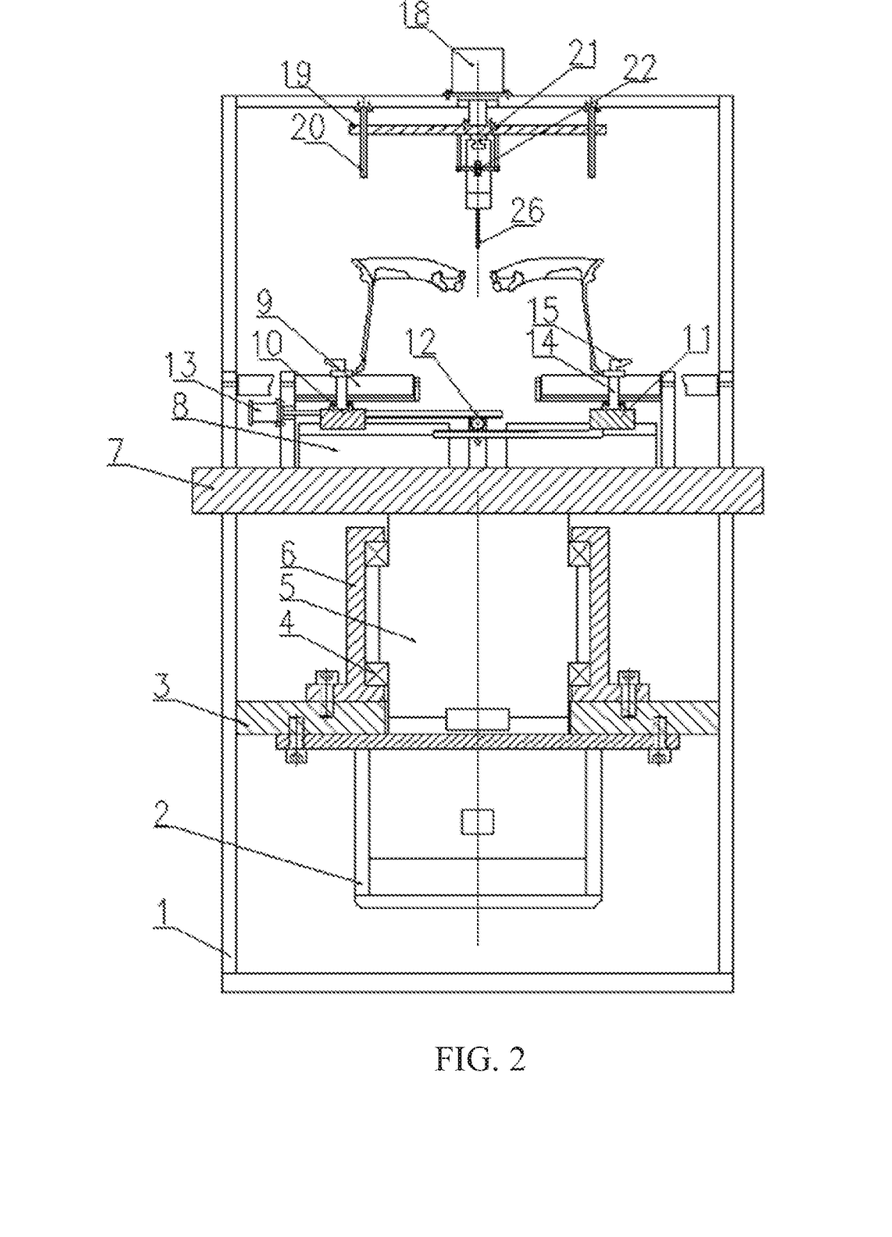
FIG. 2 is a left view of the wheel outer rim fillet dressing device of the disclosure.
Figure 3:
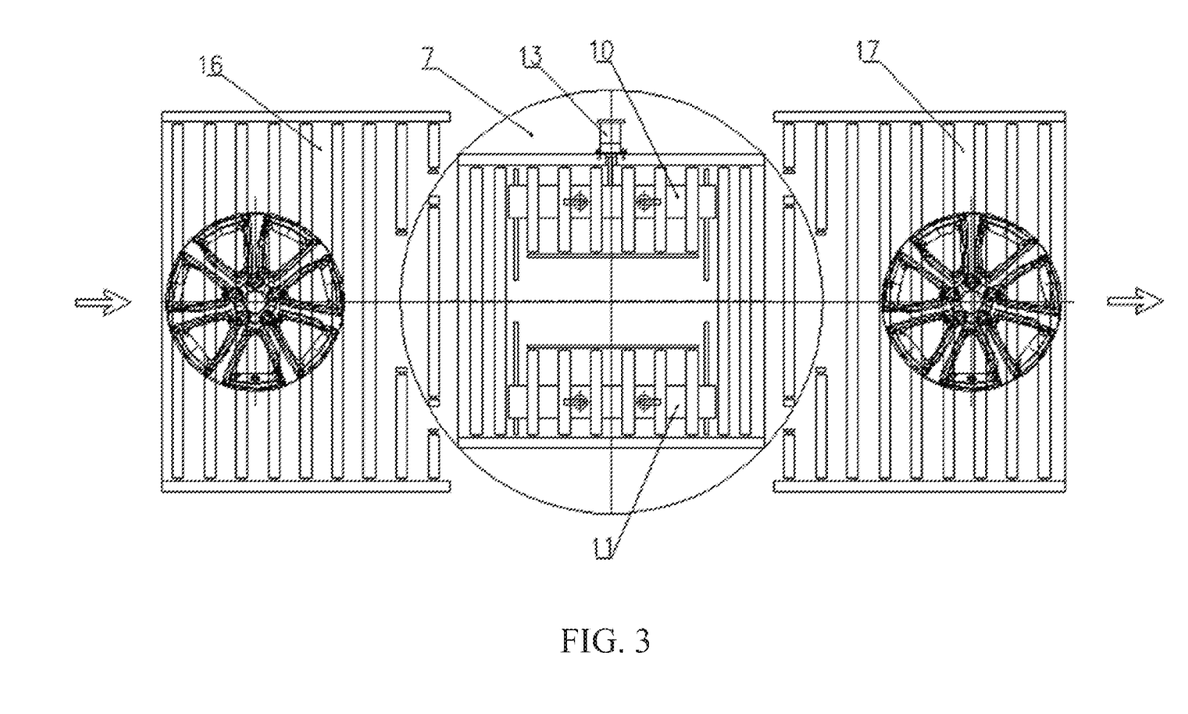
FIG. 3 is a top view of the wheel outer rim fillet dressing device of the disclosure.
Figure 4:
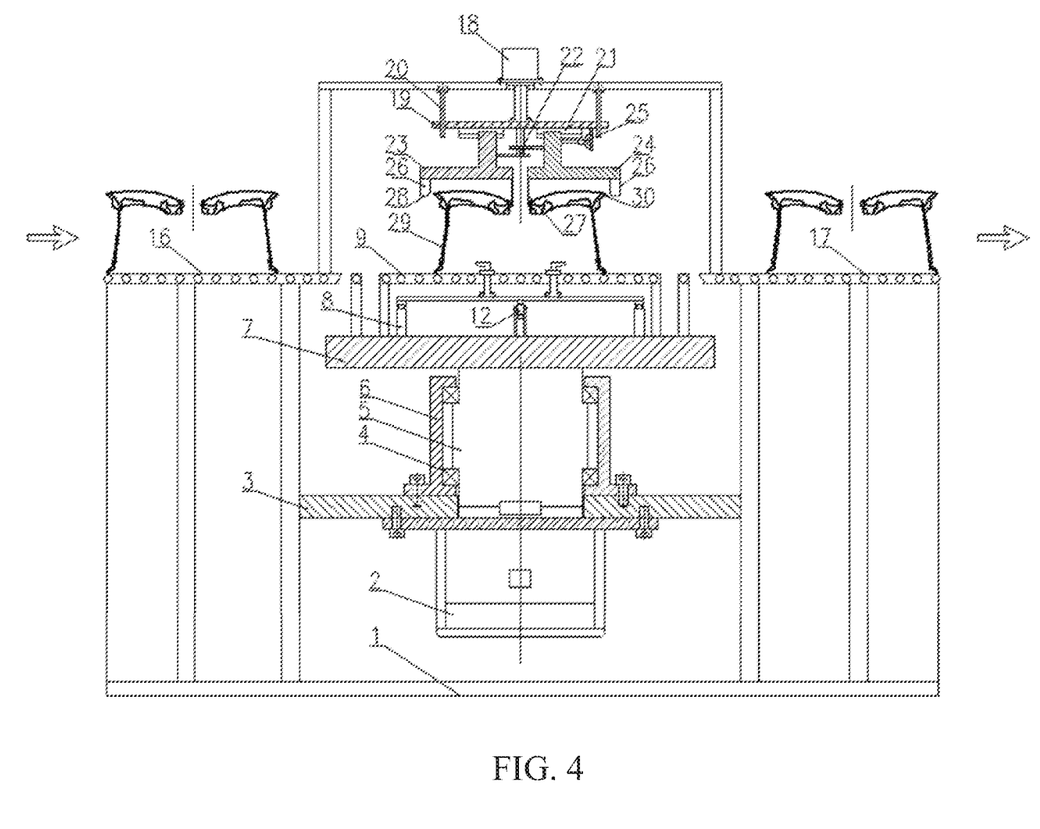
FIG. 4 is a schematic diagram of the wheel outer rim fillet dressing device of the disclosure during precision positioning.

The electric cylinder 18 is mounted above the frame 1, the output end of the electric cylinder 18 is connected with the moving plate 19, and the electric cylinder 18 controls the moving plate 19 to move up and down under the guiding effect of the four guide posts 20. The two adjusting guide rails 21 are symmetrically mounted on the moving plate 19, the first sliding table 23 and the second sliding table 24 are symmetrically mounted on the adjusting guide rails 21 and connected via the second gear rack 22, the adjusting cylinder 25 is fixed on the moving plate 19, and the output end of the adjusting cylinder 25 is connected with the second sliding table 24. A first cutter 26 for dressing wheel outer rim fillets is mounted at the first end of the first sliding table 23, a precision positioning post 27 is mounted at the second end of the first sliding table 23, and a second cutter 26 for dressing wheel outer rim fillets and a precision positioning post 27 are symmetrically mounted on the second sliding table 24. After the wheel is roughly positioned, the electric cylinder 18 drives the moving plate 19 to descend to an appropriate position, the adjusting cylinder 25 drives the second sliding table 24 to move away from the first sliding table, the first sliding table 23 moves synchronously with the second sliding table 24 under the action of the second gear rack 22, thus, the distance between the precision positioning post 27 on the first sliding table 23 and the precision positioning post 27 on the second sliding table 24 is adjusted, the precision positioning posts 27 contact the vertical surface of the cap seam allowance of the wheel and hold the wheel tightly, and this is the precision wheel positioning system. The first machining part is adopted for rough positioning, and then the second machining part is adopted for precision positioning, in which the outer rim fillets 30 are machined secondly, so after the positioning standard is converted, the concentricity is better, and the positioning precision is higher. After the wheel is precisely positioned, the corner cylinder pressure claws 15 are started to press the wheel.

The servo motor 2 is mounted on the fixed supporting plate 3, the output end of the motor is connected with the shaft 5, the rotating disc 7 is mounted at the output end of the shaft 5, and the servo motor 2 can control rotation of the rotating disc 7. After the wheel is pressed, the servo motor 2 is started to drive the wheel to rotate, and this is the wheel rotating system.

Figure 5:
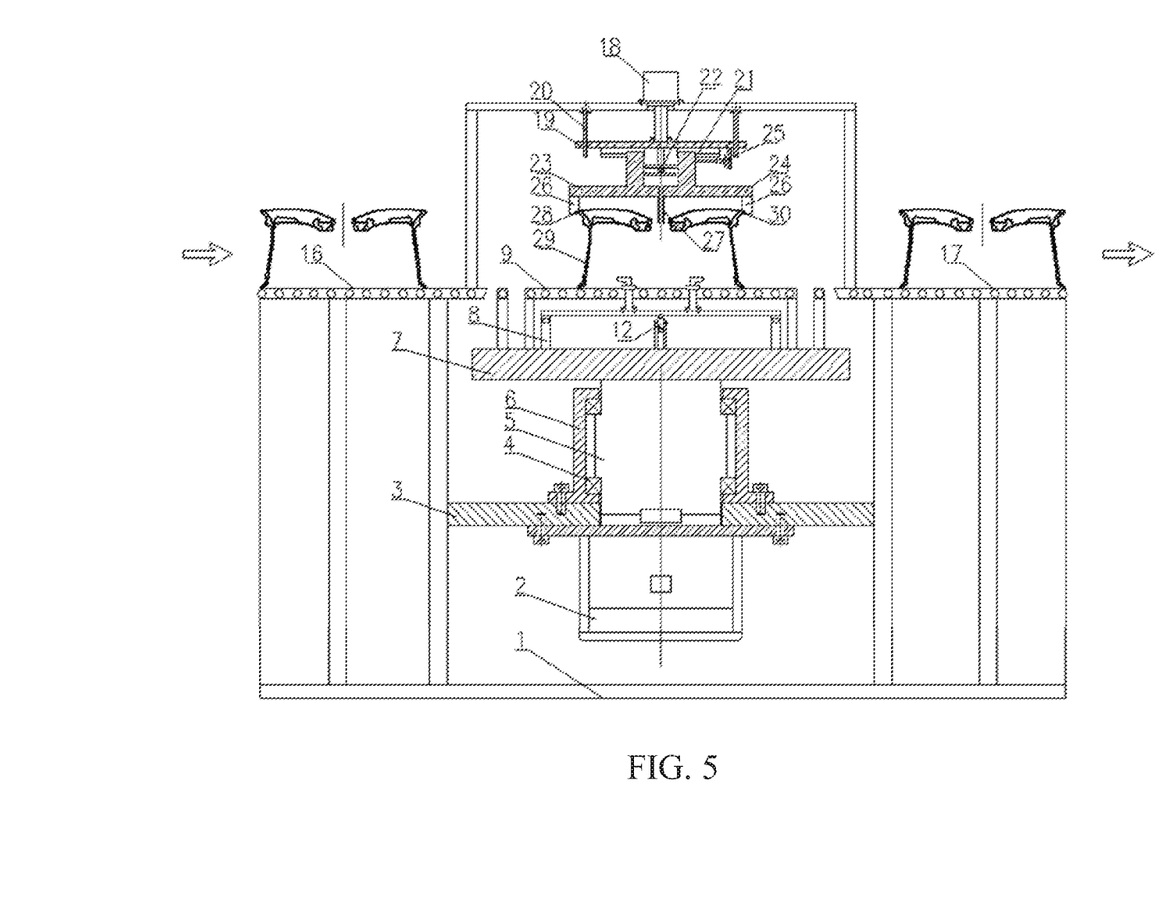
FIG. 5 is a schematic diagram when the wheel outer rim fillet dressing device of the disclosure dresses outer rim fillets.

When the adjusting cylinder 25 is started to drive the second sliding table 24 to move closer to the first sliding table, the distance between the two precision positioning posts 27 is shortened, meanwhile, the distance between the first cutter 26 for dressing wheel outer rim fillets on the first sliding table 23 and the second cutter 26 for dressing wheel outer rim fillets on the second sliding table 24 is also shortened, the outer rim fillets of the wheel can be dressed when the distance between the first cutter for dressing wheel outer rim fillets and the second cutter for dressing wheel outer rim fillets is adjusted to an appropriate position and under the cooperation of the rotating wheel, and this is the cutter system for dressing wheel outer rim fillets. By integrating the precision wheel positioning system and the cutter system for dressing wheel outer rim fillets, the positioning function and the dressing function can be switched cyclically, thereby reducing the manufacturing cost.

Figure 6:
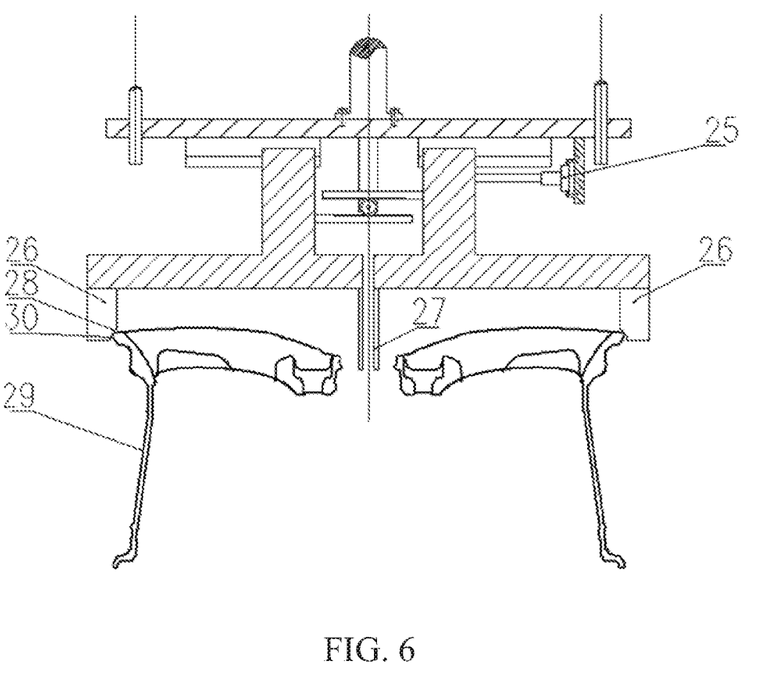
FIG. 6 is a schematic diagram of first and second cutters working a wheel outer rim.

The working process of the device is as follows: firstly, a wheel enters the positioning roller bed 9 from the wheel feeding roller bed 16, then the positioning cylinder 13 is started to drive the four positioning posts 14 to roughly position the wheel, the positioning posts 14 retract and leave the outer surface of the wheel after the wheel is roughly positioned, a clearance of 5 mm is kept between the positioning posts 14 and the wheel, next, the electric cylinder 18 is started to drive the two precision positioning posts 27 to descend and enter into appropriate positions in the cap seam allowance, then the adjusting cylinder 25 is started so that the two precision positioning posts 27 contact the vertical surface of the cap seam allowance of the wheel and hold the wheel tightly and precision positioning of the wheel is completed, the corner cylinder pressure claws 15 press the wheel, the adjusting cylinder 25 is restarted to shorten the distance between the two precision positioning posts 27, and at the moment, the distance between the first cutter for dressing wheel outer rim fillets and the second cutter for dressing wheel outer rim fillets is also synchronously shortened; next, the servo motor 2 is started so that the wheel is in a rotating state, and dressing of outer rim fillets is completed when the distance between the first cutter for dressing wheel outer rim fillets and the second cutter for dressing wheel outer rim fillets is adjusted and under the cooperation of the cutting edges 28 and the rotating wheel. After dressing of the fillets is completed, the precision positioning posts 27, the first cutter for dressing wheel outer rim fillets and the second cutter for dressing wheel outer rim fillets ascend to reset, the corner cylinder pressure claws 15 loosen the wheel, and the positioning roller bed 9 rotates and conveys the wheel to the wheel discharge roller bed 17. This is a cycle of the device, and so on.

The disclosure can meet the requirement of an automatic production line, completes dressing of wheel outer rim fillets via the cooperation of the rough positioning system, the precision positioning system, the wheel rotating system and the cutter system for dressing wheel outer rim fillets, and has the characteristics of high positioning precision, stability, high efficiency and the like.

The invention claimed is:

1. A wheel outer rim fillet dressing device, comprising a frame, a servo motor, a fixed supporting plate, bearings, a shaft, bearing seats, a rotating disc, positioning guide rails, a positioning roller bed, a first sliding plate, a second sliding plate, a first gear rack, a positioning cylinder, positioning posts, corner cylinder pressure claws, a wheel feeding roller bed, a wheel discharge roller bed, an electric cylinder, a moving plate, guide posts, adjusting guide rails, a second gear rack, a first sliding table, a second sliding table, an adjusting cylinder, a first cutter for dressing wheel outer rim fillets, a second cutter for dressing wheel outer rim fillets and two precision positioning posts, wherein the positioning roller bed and the positioning guide rails are fixedly mounted on the rotating disc, the first sliding plate and the second sliding plate are symmetrically mounted on the positioning guide rails and connected via the first gear rack, the positioning cylinder is fixed on a side of the positioning roller bed, an output end of the positioning cylinder is connected with the first sliding plate, the positioning posts are symmetrically mounted on the first sliding plate and the second sliding plate, and a corner cylinder pressure claw of the corner cylinder pressure claws is mounted on each positioning post, the wheel feeding roller bed is rotated, a wheel is entered in the positioning roller bed from the wheel feeding roller bed, the positioning cylinder is started to drive the first sliding plate to move, the second sliding plate is moved synchronously under the action of the first gear rack, the wheel is able to be roughly positioned by the positioning posts;

the first cutter for dressing wheel outer rim fillets is mounted at a first end of the first sliding table, a precision positioning post of the two precision positioning posts is mounted at a second end of the first sliding table, and the second cutter for dressing wheel outer rim fillets and a precision positioning post of the two precision positioning posts are symmetrically mounted on the second sliding table; after the wheel is roughly positioned, the moving plate is driven by the electric cylinder to descend to an appropriate position, the second sliding table is driven by the adjusting cylinder to move away from the first sliding table, the first sliding table is moved synchronously with the second sliding table under the action of the second gear rack, thus a distance between the precision positioning post on the first sliding table and the precision positioning post on the second sliding table is adjusted, the two precision positioning posts are in contact with a vertical surface of a cap seam allowance of the wheel and the wheel is held tightly, and this is a precision wheel positioning system;

when the adjusting cylinder is started to drive the second sliding table to move closer to the first sliding table, the distance between the two precision positioning posts is shortened, meanwhile, a distance between the first cutter for dressing wheel outer rim fillets on the first sliding table and the second cutter for dressing wheel outer rim fillets on the second sliding table is also shortened, the outer rim fillets of the wheel are able to be dressed when the distance between the first cutter for dressing wheel outer rim fillets and the second cutter for dressing wheel outer rim fillets is adjusted to an appropriate position and under the cooperation of the wheel upon the wheel being rotated by the servo motor, and this is a cutter system for dressing wheel outer rim fillets.

* * * * *